US010773763B2

(12) United States Patent
 Kaise

(10) Patent No.: US 10,773,763 B2
(45) Date of Patent: Sep. 15, 2020

(54) BICYCLE KICKSTAND INSTALLATION ADAPTER AND DOUBLE LEG STAND COMPRISING SAME

(71) Applicant: KAISE CO., LTD., Tokyo (JP)

(72) Inventor: Daichi Kaise, Tokyo (JP)

(73) Assignee: KAISE CO., LTD., Tokyo (JP)

( * ) Notice: Subject to any disclaimer, the term of this patent is extended or adjusted under 35 U.S.C. 154(b) by 0 days.

(21) Appl. No.: 16/637,047

(22) PCT Filed: Oct. 2, 2017

(86) PCT No.: PCT/JP2017/035771
§ 371 (c)(1),
(2) Date: Feb. 6, 2020

(87) PCT Pub. No.: WO2019/069343
PCT Pub. Date: Apr. 11, 2019

(65) Prior Publication Data
US 2020/0239094 A1    Jul. 30, 2020

(51) Int. Cl.
 *B62H 1/04* (2006.01)
(52) U.S. Cl.
 CPC ...................... *B62H 1/04* (2013.01)
(58) Field of Classification Search
 CPC ... B62H 1/04; B62H 1/00; B62H 1/06; B62H 3/08; B62H 3/10; B62H 2700/00; B62H 3/04
 See application file for complete search history.

(56) References Cited

U.S. PATENT DOCUMENTS

| 759,627 | A | * | 5/1904 | McCurd | B62H 1/06 280/300 |
| 998,703 | A | * | 7/1911 | Lowe | B62H 1/06 280/300 |
| 1,006,125 | A | * | 10/1911 | Potter | B62H 1/00 280/302 |
| 1,060,649 | A | * | 5/1913 | Tobin | B62H 1/00 280/297 |
| 1,107,427 | A | * | 8/1914 | Kasdorff | B62H 1/00 280/302 |

(Continued)

FOREIGN PATENT DOCUMENTS

| JP | 27548 Z | 5/1913 |
| JP | S59-110784 U | 7/1984 |

(Continued)

*Primary Examiner* — Ruth Ilan
*Assistant Examiner* — Conan D Duda
(74) *Attorney, Agent, or Firm* — Muncy, Geissler, Olds & Lowe, P.C.

(57) ABSTRACT

This bicycle stand installation adapter (1) is equipped with: affixed bodies (11) to be affixed to left and right chain stays (8) constituting parts of the frame (7) of a bicycle (100) with quick-release skewers; affixing pieces (12) that are affixed to the affixed bodies (11) and extend along the chain stays (8); and spacers (25) to be interposed between left and right rear end parts (10) and the corresponding affixing pieces (12), the left and right rear end parts (10) being located at the back end of the frame (7). The affixing pieces (12) are affixed to both ends (5) of a substantially C-shaped dual-leg kickstand (2) to be installed on the rear end parts (10).

4 Claims, 5 Drawing Sheets

(56) References Cited

U.S. PATENT DOCUMENTS

| | | | | |
|---|---|---|---|---|
| 1,137,368 A * | 4/1915 | Vesich | ............ | B62H 1/00 280/302 |
| 1,168,294 A * | 1/1916 | Etter | ............ | B62H 1/00 280/302 |
| 1,183,834 A * | 5/1916 | Miyanaga | ............ | B62H 1/00 280/302 |
| 1,213,994 A * | 1/1917 | Anderson | ............ | B62H 1/00 280/302 |
| 1,233,512 A * | 7/1917 | Schuyler | ............ | B62H 1/00 280/302 |
| 1,237,541 A * | 8/1917 | Monahan | ............ | B62H 1/00 280/302 |
| 1,278,113 A * | 9/1918 | Dambacher | ............ | B62H 1/00 280/299 |
| 1,280,069 A * | 9/1918 | Morgan | ............ | B62H 1/00 280/299 |
| 1,304,457 A * | 5/1919 | Craig | ............ | B62H 1/00 280/302 |
| 1,338,029 A * | 4/1920 | Lydecker | ............ | B62H 1/00 280/299 |
| 1,347,355 A * | 7/1920 | Tinsley | ............ | B62H 1/00 280/302 |
| 1,385,020 A * | 7/1921 | Maurice | ............ | B62H 1/00 280/297 |
| 2,633,934 A * | 4/1953 | Champoux | ............ | B62H 1/06 188/5 |
| 4,443,024 A * | 4/1984 | Okai | ............ | B62H 1/06 280/304 |
| 2007/0235979 A1* | 10/2007 | Lin | ............ | B62H 1/04 280/293 |

FOREIGN PATENT DOCUMENTS

| | | |
|---|---|---|
| JP | 2008-155838 A | 7/2008 |
| JP | 2009-227263 A | 10/2009 |
| JP | 2010-89678 A | 4/2010 |
| JP | 2010-089678 A | 4/2010 |
| JP | 2011-000972 A | 1/2011 |
| JP | 2011-105311 A | 6/2011 |
| JP | 2013-129310 A | 7/2013 |
| JP | 2016-013825 A | 1/2016 |

* cited by examiner

BICYCLE KICKSTAND INSTALLATION ADAPTER AND DOUBLE LEG STAND COMPRISING SAME

TECHNICAL FIELD

The present invention relates to an adapter for installing a bicycle kickstand employed in bicycles with a quick release type wheel (hereinafter referred to as quick release type bicycles) and a dual-leg kickstand including this adapter.

BACKGROUND ART

Currently, road bicycles and mountains bicycles, which are categorized as sporting bicycles, utilizes a quick release mechanism which enables the wheels to be removed easily by hand. The quick release mechanism is a member that is inserted through a cylindrical hub in the center of the wheel and a rear end located in the back end of the bicycle frame to connect the wheel and the rear end of the frame with each other. The quick release has a lever and a nut on the opposite ends of the shaft that is inserted through the rear end and the hub. By tightening the nut and turning the lever down, the quick release is fixed in position. The quick release as described above are recently utilized in small-wheel bicycles, and its use rate is on the increase.

Quick release type bicycles whose rear wheel is supported by the quick release as mentioned above cannot be provided with a kickstand, at the rear end portion of the frame, to hold the bicycle in the upright position. To install the kickstand for such bicycles, the users have to mount the kickstand directly on the bicycle frame, for example. And because of this restriction that the kickstand must be installed on the frames, so-called single-leg kickstands are the mainstream at the present time.

However, for those bicycles which have a quick release mechanism, there still exists a demand for installing a dual-leg kickstand that sandwiches the rear wheel axle so as to be rotatable between the vehicle backwards and the vehicle downwards. Installation of such a structure utilizing the rear end can be used not only for the kickstand but for a mechanism that securely supports a child seat.

As a kickstand, which sandwiches the rear wheel axle, those that are separate from the vehicle body (separate kickstand) are already known (refer to Patent Document 1 for example). However, a kickstand that is integrated with the vehicle body is more convenient during the travel of the bicycle. In addition, with the dual-leg kickstand, a cyclist can perform the holding and flipping up by simple operation by foot. The kickstand in the Patent Document 1 is troublesome and inconvenient because it is difficult to carry with during the travel and it needs to be operated by both hands in order to hold up and flip up.

RELATED ART DOCUMENT

Patent Document

Patent Document 1: Japanese Unexamined Patent Application Publication No. 2010-89678

SUMMARY OF THE INVENTION

Technical Problem

The present invention is made in consideration of the related techniques mentioned above, and the purpose of the present invention is to provide a bicycle kickstand installation adapter and dual-leg kickstand including the bicycle kickstand installation adapter, which allow a bicycle to be held upright and flipped up with a simple operation and allows the a dual-leg kickstand to be installed also on the rear wheel axle of the quick release type bicycle so as to be rotatable about the rear wheel axle.

Solution to Problem

To achieve the purpose mentioned above, the present invention provides a bicycle kickstand installation adapter which includes: a fixing body to be fixed to each of left and right chain stays, which is part of a frame of a quick release type bicycle; an affixing piece to be fixed to the each fixing body and extend along the chain stay; and a spacer to be interposed between left and right rear ends located at a rear end of the frame and the corresponding affixing piece. The affixing piece is fixed to a vertical bar upper end of a dual-leg kickstand in an approximate C shape, which is installed at the rear end.

Preferably, the affixing piece has a standard thickness in an up-and-down direction, the vertical bar upper end of the dual-leg kickstand has a locking claw extending from its vertical end toward the frame, and the standard thickness corresponds to a distance between the upper and lower locking claws.

Preferably, the fixing body has an inner block and an outer block to sandwich the chain stay from left and right, the fixing body further has a uniting member to fix the inner block, the outer block, and the affixing piece with each other, and the outer block has a through hole passing through the outer block along the chain stay in a state where the outer block is attached to the chain stay.

Preferably, the uniting member is a bolt, which extends from the fixing body toward the affixing piece, and a nut, which is screwed onto the bolt, the affixing piece is provided with a bolt hole, through which the bolt is inserted, and the bolt hole is an arcuate long hole curving downwards.

Furthermore, the present invention provides a dual-leg kickstand including the bicycle kickstand installation adapter. Here, the dual-leg kickstand is formed with left and right vertical bars and a cross bar continuing from one end of the vertical bars, the affixing piece is integrally formed with the vertical bar upper end located on the other end of the left and right vertical bars, and the crossbar has a length adjuster to extend or shrink the overall length in the left-and-right direction.

Advantageous Effects of Invention

According to the present invention, the vertical bar upper end of the dual-leg kickstand is installed on the chain stay via the fixing body, so the dual-leg kickstand can be installed on the rear wheel axle of the quick release type bicycle and the dual-leg kickstand can be stably held on the vehicle body. Since the affixing piece extends along the chain stay, the stability is enhanced. With such a structure, unwilling rotation of the dual-leg kickstand about the rear wheel axle can be restrained compared to the case where the dual-leg kickstand is merely supported by the rear wheel axle alone. Therefore, the dual-leg kickstand can be adapted to the quick release type bicycle in a favorable manner. Also, the advantage of the dual-leg kickstand, which is the ease of operation for holding up and flipping up, can be realized with the quick release type bicycle.

Also, the affixing piece is hooked, with its standard thickness, on the locking claw disposed on the vertical bar upper end of the dual-leg kickstand, so the vertical bar upper end of the dual-leg kickstand is firmly fixed. Therefore, unwilling rotation of the vertical bar upper end of the dual-leg kickstand can be prevented.

As a result of the fixing body being formed with the inner block and the outer block, the chain stay can be sandwiched and fixed from the left and right, and the secure fixation can be realized. Furthermore, the shift wire can be passed through the through hole, so the present invention can be favorably adapted to the quick release type bicycle equipped with the rear derailleur.

Also, the bolt hole in the affixing piece is formed into the arcuate long hole, so the angle between the affixing piece and the chain stay can be adjusted. Thus, the installation angle of the dual-leg kickstand, which is fixed to this affixing piece via the locking claw, can also be adjusted, so the dual-leg kickstand can be installed on the quick release type bicycle at a proper angle.

Furthermore, the present invention also provides a dual-leg kickstand, in which the affixing piece and the vertical bar upper end of the dual-leg kickstand are integrated, so that the number of parts can be reduced and the dual-leg kickstand can be favorably adapted to the quick release type bicycle. By such integration, the installation work becomes easy and speedy. Also, with the use of the length adjuster, which enables the crossbar of the dual-leg kickstand to extend or shrink, the dual-leg kickstand can be adapted to a wide range of left and right rear end width.

DESCRIPTION OF EMBODIMENTS

Figure 1:
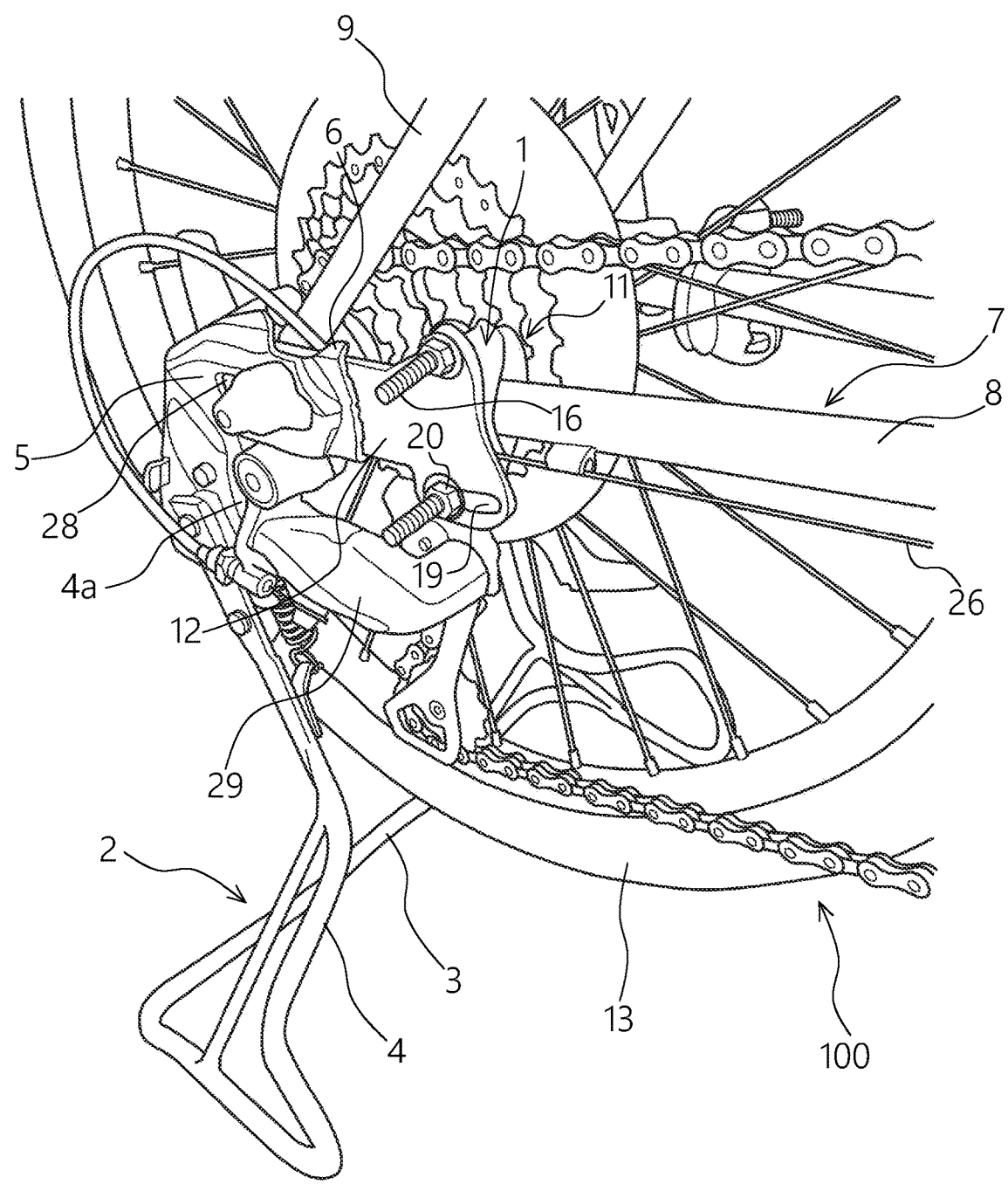
FIG. 1 is a schematic view showing a state where a dual-leg kickstand is installed on a quick release type bicycle by using a bicycle kickstand installation adapter of the present invention.
Figure 2:
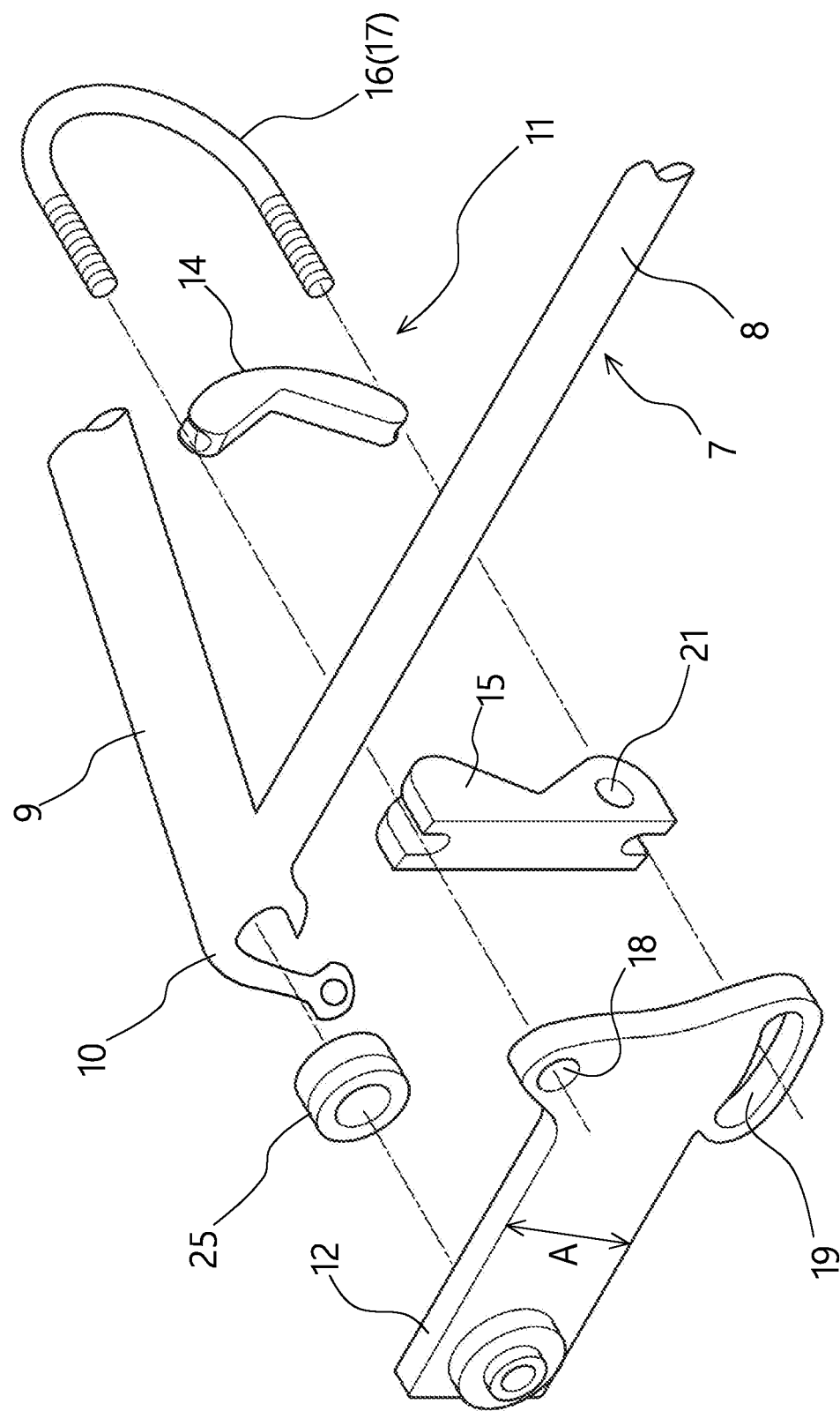
FIG. 2 is an exploded view showing an aspect in which the bicycle kickstand installation adapter of the present invention is installed.

As shown in FIG. 1 and FIG. 2, a bicycle kickstand installation adapter 1 of the present invention is used for installing a dual-leg kickstand 2 separately sold on the market (also referred to as separate dual-leg kickstand) to a quick release type bicycle 100. Here, the dual-leg kickstand 2 as a separate member, to which the present invention is applied, has left and right vertical bars 4 and a crossbar 3 that continues from one end of these vertical bars 4, and is formed generally into a C shape. The other end of the left and right vertical bar 4 is formed as a vertical bar upper end 5. The vertical bar upper end 5 is generally in the shape of a plate, and a locking claw 6 is formed on the top and bottom ends of the vertical bar upper end 5 in a bending and protruding manner. The locking claw 6 is formed in order to hook and fix the kickstand onto a chain stay 8, a seat stay 9, or a rear end 10, which are part of a frame 7 as a constituent member of the bicycle 100. In a separate dual-leg kickstand applicable to the present invention, this locking claw 6 needs to be formed for the purpose of being hooked, or in a way so as to be hookable, at least on the chain stay 8. That is, the locking claw 6 protrudes from the vertical bar upper end 5 toward the chain stay 8.

Figure 3:
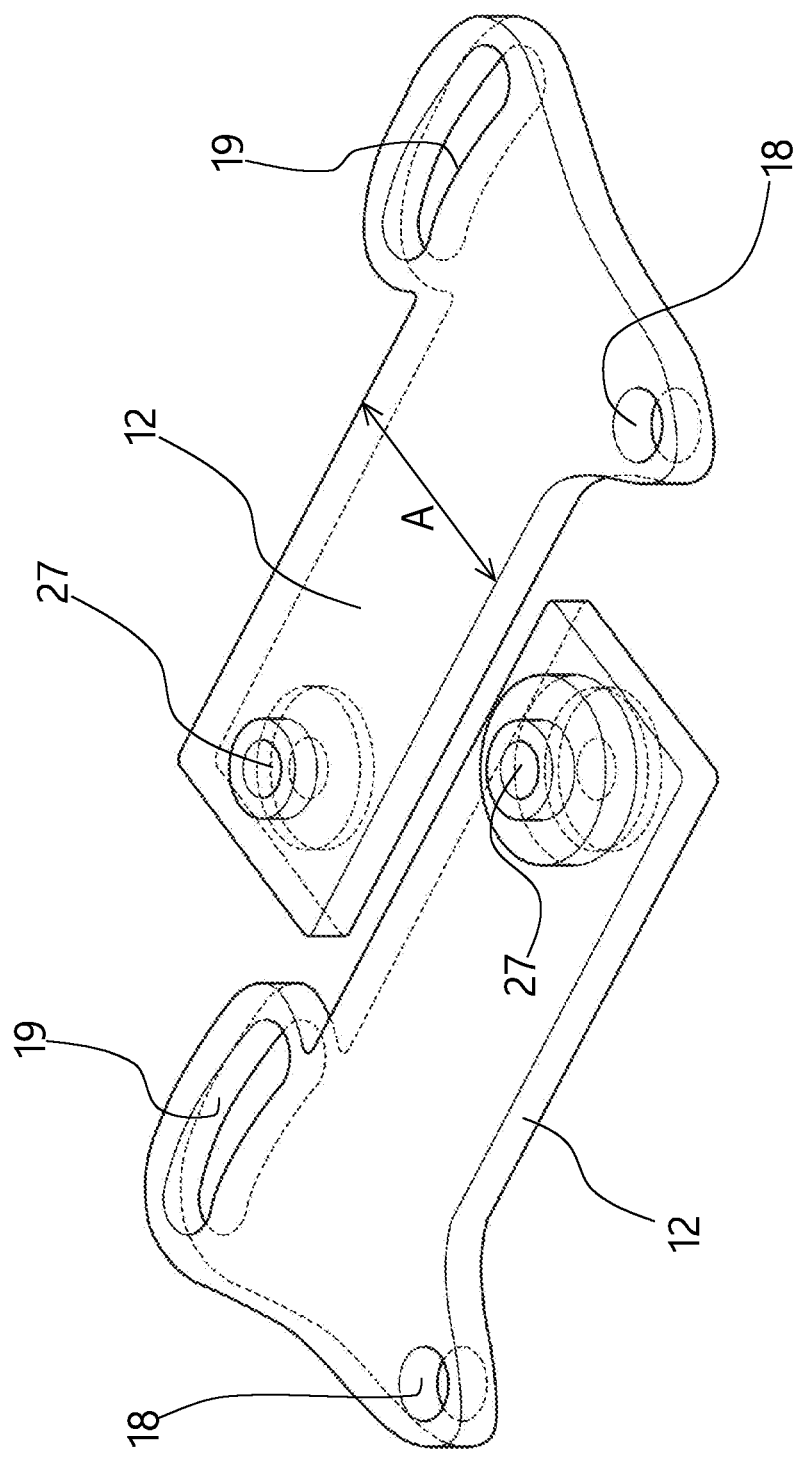
FIG. 3 is a schematic view of an affixing piece.

Here, each adapter 1 has a fixing body 11 to be fixed to the left and right chain stays 8, which are part of the frame 7 of the quick release type bicycle 100. The affixing piece 12 is fixed to the fixing body 11. The affixing piece 12 is generally in the shape of a plate (refer to FIG. 3). One end of the affixing piece 12 is fixed to the fixing body 11, and the affixing piece 12 extends from the one end toward the other end along the chain stay 8. A spacer 25 is interposed between the left and right rear end 10 at the rear end of the frame 7 and the corresponding affixing piece 12. The spacer 25 is formed generally in the cylindrical shape since a shaft (quick shaft) 23 (refer to FIG. 5) described later is inserted through this spacer 25.

The outer surface of the spacer 25 is located on the same plane as a contact surface between the affixing piece 12 and an outer block 15 described later. Accordingly, the affixing piece 12 can be fixed in parallel with the vehicle body so that the separate dual-leg kickstand 2 can be favorably installed. In this way the spacer 25 creates a mounting surface for the affixing piece 12 on the outside of the vehicle body. So, the affixing piece 12 can be securely mounted regardless of the frame shape in the vicinity of the rear end 10.

The rear end 10 is formed generally in the shape of a semicircle with an open end, through which the axle of a rear wheel 13 (not shown) is inserted and held. In other words, the rear end 10 functions as a bearing for the rear wheel 13. Also, the affixing piece 12 is provided with a hole 27, through which the shaft 23 is inserted. The shaft 23, which constitutes a quick release mechanism, is inserted through the axle (hub) of the rear wheel 13, thereby realizing the rotation about the center of axle of the rear wheel 13. The vertical bar upper end 5 is also fixed to the rear end 10 through this shaft. That is, the shaft 23 is inserted from the vehicle body outside through the vertical bar upper end 5, the affixing piece 12, the spacer 25, the rear end 10, and the rear wheel 13 in the stated order. The vertical bar upper end 5 is provided with a shaft hole 28, through which the shaft 23 is inserted. The shaft hole 28 is a long hole extending in the vehicle fore-and-aft direction. The presence and the shape of the shaft hole 28 allows the installation position of the separate dual-leg kickstand 2 to be adjusted in relation to the vehicle body. The vertical diameter of the shaft hole 28 is predetermined so that the shaft 23 can be inserted through the shaft hole 28.

The shaft hole 28 being formed into a long hole is of exceptional importance. In general, when a kickstand is installed on the quick release type bicycle 100, a rear derailleur 29 as a gear changing mechanism and an upper portion 4a of the vertical bar 4 (proximity of the rear derailleur 29) often abut each other. However, in the present invention, the installation position of the kickstand can be shifted backwards in relation to the vehicle body since the shaft hole 28 is shaped in the long hole, and therefore the kickstand can be installed without an interference between the upper portion 4a and the rear derailleur 29.

According to this structure, the vertical bar upper end 5 of the separate dual-leg kickstand 2 is mounted to the chain stay 8 via the fixing body 11. Therefore, when the separate dual-leg kickstand 2 is installed on the rear wheel axle (rear end 10) of the quick release type bicycle 100, the separate dual-leg kickstand 2 can be held stably on the vehicle body. Here, the stability is enhanced since the affixing piece 12 extends along the chain stay 8. With such a structure, unwilling rotation of the separate dual-leg kickstand 2 about the rear wheel axle can be restrained compared to the case where the separate dual-leg kickstand 2 is merely supported by the rear wheel axle alone. Therefore, the separate dual-leg kickstand 2 can be adapted to the quick release type bicycle 100 in a favorable manner, and the advantage of the separate dual-leg kickstand 2, i.e. the easy operation for holding up and flipping up, can be realized with the quick release type bicycle 100.

The affixing piece 12 is fixed to the vertical bar upper end 5 of the separate dual-leg kickstand 2. Specifically, the affixing piece 12 has a standard thickness A in the up-and-down direction, and this standard thickness A is coincident with the distance between the upper and lower locking claws 6. Because of this standard thickness A of the affixing piece 12, the locking claw 6 on the vertical bar upper end 5 of the separate dual-leg kickstand 2 can be hooked on the affixing piece 12 without a gap. Therefore, the vertical bar upper end 5 of the separate dual-leg kickstand 2 is securely fixed to the vehicle body via the affixing piece 12.

Figure 4:
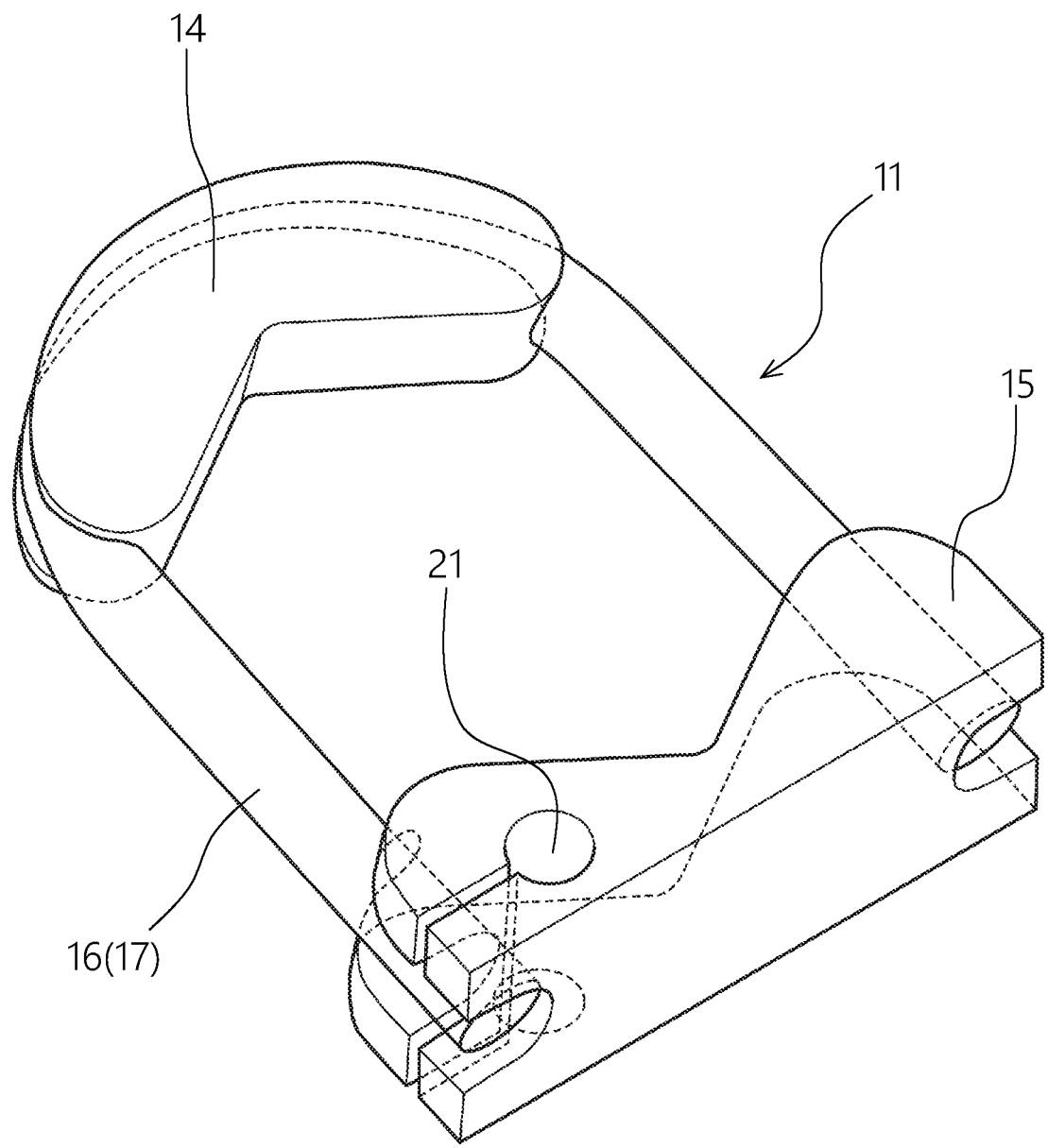
FIG. 4 is a schematic view of a fixing body.

As shown in FIG. 4, the fixing body 11 has an inner block 14 and an outer block 15, which is used to sandwich the chain stay 8 from left and right. In order to sandwich the chain stay 8, the surfaces of the inner block 14 and outer block 15 to sandwich the chain stay 8 are formed in a recessed shape. By forming the fixing body 11 in this way with the inner block 14 and the outer block 15, the chain stay 8 can be sandwiched and held tightly from left and right. The outer block 15 is firmly in contact with the affixing piece 12, and the inner block 14, the outer block 15, and the affixing piece 12 are fixed to each other by a uniting member 16. The uniting member 16 is for example a bolt 17, which extends from the inner block 14 toward the outer block 15 to tie up the inner block 14 and the outer block 15. As is evident from FIG. 3, the affixing piece 12 is provided with bolt holes 18, 19, which pass through the affixing piece 12, and the bolt 17 is inserted through this bolt hole 18. Then the affixing piece 12 is tightened from outside by a nut 20, which is screwed onto the bolt 17. The bolt 17 extends from the upper and lower ends of the inner block 14 toward the outer block 15 through the upper and lower sides of the chain stay 8. Because of this structure, the bicycle kickstand installation adapter can be mounted to various chain stays 8 regardless of the shapes (round or square), sizes (for example φ40 mm thickness or thinness), and angles (horizontal and vertical). In the example of FIG. 4, the bolt 17 is a U-shaped bolt, and its curved portion is fitted along a groove formed in the inner block 14.

Among the bolt holes 18, 19 of the affixing piece 12 to which these bolts are inserted, the bolt hole 19 to which the lower bolt 17 is inserted is an arcuate long hole bulging downwards. By making the bolt hole 19 in the affixing piece 12 an arcuate long hole in this way, an angle between the chain stay 8 and the affixing piece 12 can be adjusted. Thus, the installation angle of the separate dual-leg kickstand 2, which is fixed to this affixing piece 12 via the locking claw 6, can also be adjusted, so the separate dual-leg kickstand 2 can be installed on the quick release type bicycle 100 at a proper angle. Also, with the long hole as described above, the installation angle of the separate dual-leg kickstand 2 becomes steplessly adjustable within the range of approximately 30 degrees. With small-wheel bicycles in which the chain stay 8 is raised toward the vehicle body center or with the sporting bicycles having 26 inch or 700C wheels in which the chain stay 8 is brought down toward the vehicle body center, the angle of the kickstand to hold up the bicycle can be maintained optimally and appropriately whenever the bicycle is parked with the kickstand.

The outer block 15 has a through hole 21, which passes through along the chain stay 8 in the state where the outer block 15 is mounted on the chain stay 8. In the quick release type bicycle 100, the chain stay 8 is provided with a shift wire 26, which is needed for operation of the rear derailleur 29 as a gearing mechanism and arranged along the chain stay 8. So, the shift wire 26 can be guided by utilizing this through hole 21. That is, the outer block 15 does not hinder the arrangement of the shift wire 26. The through hole 21 may be of any shape as long as the shift wire 26 can pass in the direction of the chain stay 8 of the outer block 15. For example, the through hole 21 may be in the shape of a groove.

Figure 5:
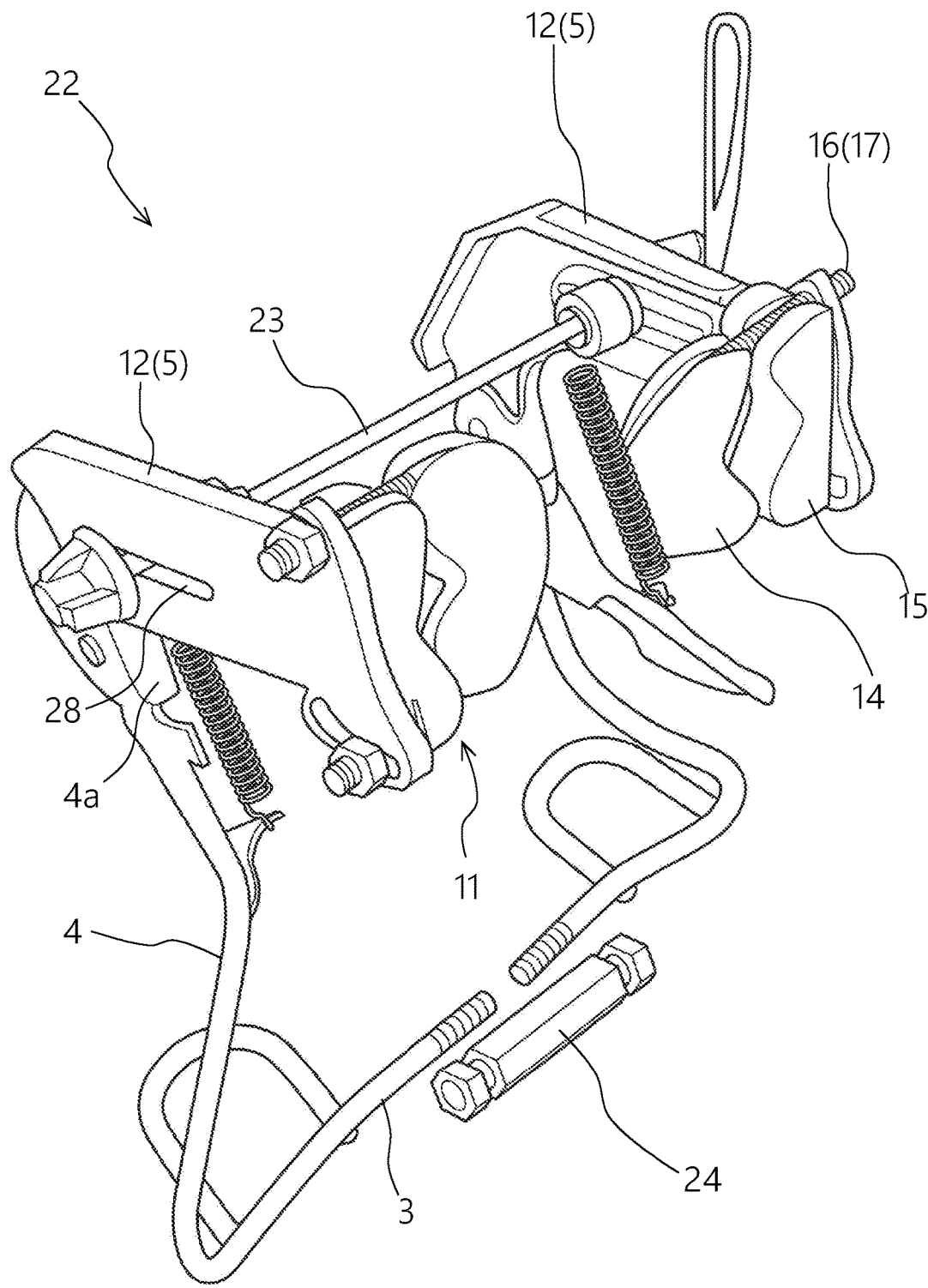
FIG. 5 is a schematic view of the dual-leg kickstand including the bicycle kickstand installation adapter of the present invention.

The above example shows a case where the separate dual-leg kickstand 2 available on the market is installed by using the bicycle kickstand installation adapter 1. Meanwhile, the present invention also provides an integrated dual-leg kickstand 22, in which the bicycle kickstand installation adapter 1 is integrated with the dual-leg kickstand. As shown in FIG. 5, the integrated dual-leg kickstand 22 differs from the above example in the following respect.

The affixing piece 12 is formed integrally with the vertical bar upper end 5, which is located on each of the other end of the left and right vertical bars 4. That is, the vertical bar upper end 5 of the separate dual-leg kickstand 2 and the affixing piece 12 are formed integrally. The affixing piece 12 also functions as the vertical bar upper end 5, which means the affixing piece 12 serves to enable the fixation to the rear end 10 by means of the shaft 23 and also the fixation to the chain stay 8 by means of the uniting member 16 via the fixing body 11. As a result of integration of the affixing piece 12 and the vertical bar upper end 5 of the dual-leg kickstand in this way, the number of parts can be reduced. And therefore, the integrated dual-leg kickstand 22, which is favorably adapted to the quick release type bicycle 100, can be provided. Due to the integration, the installation work becomes easy and speedy.

On the other hand, the crossbar 3 has a length adjuster 24 to extend or shrink the overall length in the left-and-right direction. Specifically, the length adjuster 24 is a screw member provided with a female thread on both ends, into which the thread formed on the cut-end portions of the crossbar 3 is screwed. By interposing the length adjuster 24 between the crossbars 3, the length of the crossbars 3 can be adjusted. By making the length of the crossbar 3 of the integrated dual-leg kickstand 22 adjustable with the use of the length adjuster 24, the integrated dual-leg kickstand 22 can be adapted to a wide range of left and right rear end width.

As described above, the present invention provides the bicycle kickstand installation adapter 1 and the integrated dual-leg kickstand 22, which can favorably be adapted to the quick release type bicycle 100. In other words, the present invention provides an adapter, which enables the dual-leg kickstand to be installed on the sporting bicycles with a dropout fork end, while keeping the quick shaft mechanism, which is used for fixing the quick rear hub originally equipped on the bicycle to the vehicle body (dropout fork end). When this adapter 1 is used, the separate dual-leg kickstand 2 is fixed to the vehicle body at the following three points. The first point is the fixation to the rear end 10 with the use of the quick shaft 23. The second point is the fixation to the chain stay 8 with the use of the fixing body 11 and the affixing piece 12. The third point is the fixation to the affixing piece 12 with the use of the locking claw 6. Through fixation by these three points, the separate dual-leg kickstand 2 is securely fixed to the vehicle body.

1: bicycle kickstand installation adapter, 2: separate dual-leg kickstand, 3: crossbar, 4: upper portion of vertical bar (proximity of rear derailleur), 5: vertical bar upper end, 6: locking claw, 7: frame, 8: chain stay, 9: seat stay, 10: rear end, 11: fixing body, 12: affixing piece, 13: rear wheel, 14: inner block, 15: outer block, 16: uniting member, 17: bolt, 18: bolt hole, 19: bolt hole, 20: nut, 21: through hole, 22: integrated dual-leg kickstand, 23: shaft, 24: length adjuster, 25: spacer, 26: shift wire, 27: hole, 28: shaft hole, 29: rear derailleur, 100: quick release type bicycle, A: standard thickness

The invention claimed is:

1. A bicycle kickstand installation adapter comprising:
   a fixing body to be fixed to each of a left chain stay and a right chain stay which are part of a frame of a quick release bicycle;
   an affixing piece to be fixed to each said fixing body and respectively extending along the left and right chain stay;
   a spacer to be interposed between said corresponding affixing piece and a rear end of the left chain stay and a rear end of the right chain stay located at a rear end of the frame,
   a dual-leg kickstand that includes vertical bar upper ends and has an approximate C shape installed at the rear end of the frame, wherein each of said affixing pieces are fixed to one of said vertical bar upper ends respectively,
   said fixing body comprises an inner block and an outer block to sandwich one of the left and right chain stays from side to side,
   said fixing body further comprises a uniting member to unite said inner block, said outer block, and said affixing piece with each other, and
   said outer block comprises a through hole running parallel to the chain stays, said through hole being configured to receive a shift wire to attach at least one of said outer blocks to at least one of the left and right chain stays.

2. The bicycle kickstand installation adapter of claim 1, wherein
   said affixing piece comprises a standard thickness in an up-and-down direction,
   said vertical bar upper ends of said dual-leg kickstand comprise a locking claw extending from said vertical ends toward the frame, said locking claw including an upper locking claw and a lower locking claw, and
   the standard thickness corresponds to a distance between said upper and lower locking claws.

3. The bicycle kickstand installation adapter of claim 1, wherein
   said uniting member is a bolt, which extends from said fixing body to said affixing piece, and a nut, which is screwed onto said bolt,
   said affixing piece is provided with a bolt hole, through which said bolt is inserted, and
   said bolt hole is an arcuate long hole bulging downwardly.

4. A dual-leg kickstand comprising the bicycle kickstand installation adapter of claim 1, wherein
   said dual-leg kickstand includes left and right vertical bars extending downwardly from said vertical bar upper ends respectively, said dual-leg kickstand further including a cross bar spaced from and opposite said vertical bar upper ends and which extends from said left vertical bar to said right vertical bar,
   said affixing piece is integrally formed with the vertical bar upper ends, and
   said crossbar comprises a length adjuster to extend or shrink the overall length of said crossbar in the left-and-right direction.

* * * * *